Figure 1:
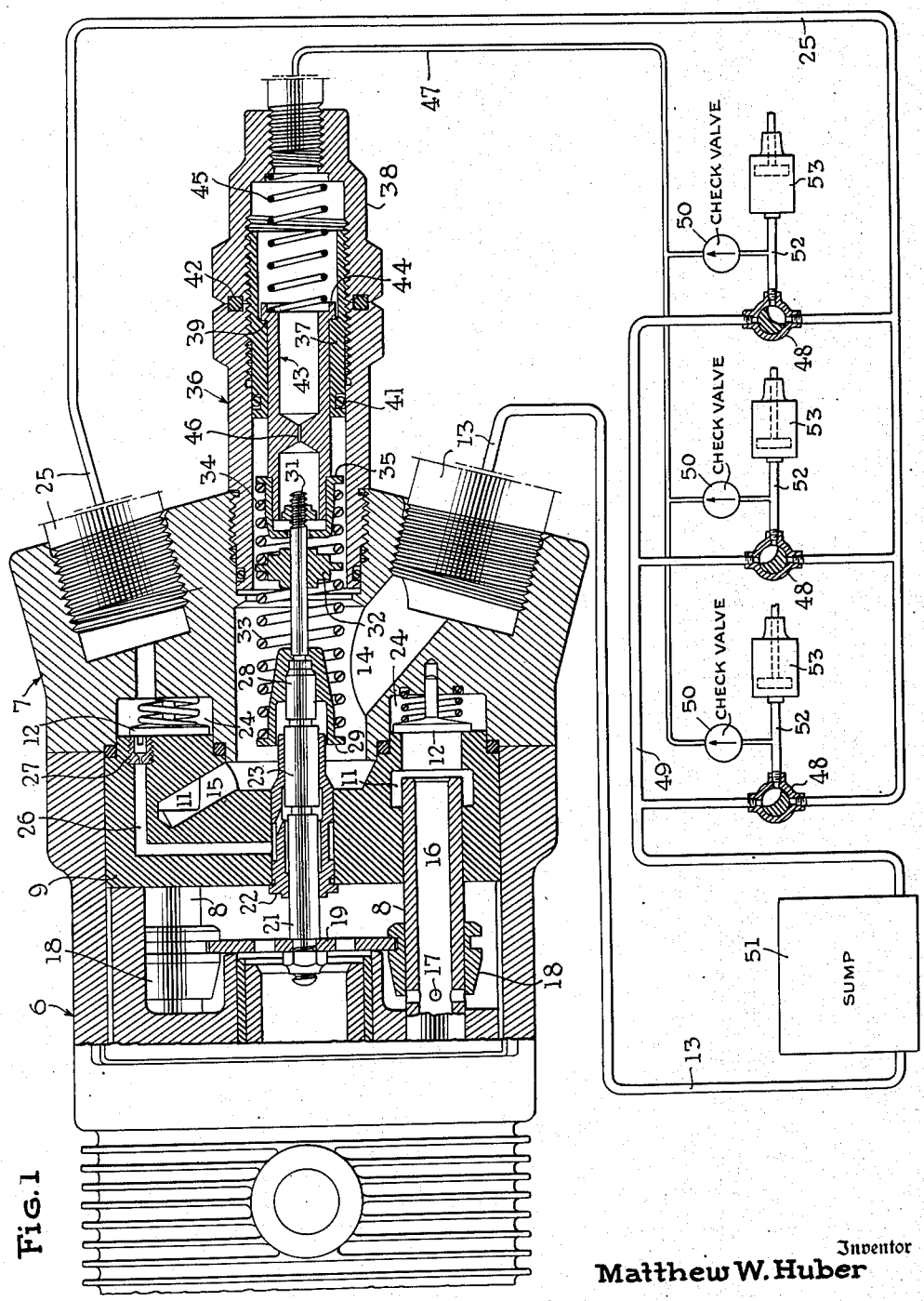

March 1, 1949. M. W. HUBER 2,462,971
HYDRAULIC CIRCUIT WITH DUAL PRESSURE CONTROL
Filed May 8, 1947 2 Sheets-Sheet 1

Inventor
Matthew W. Huber
By Dodge
Attorneys

Patented Mar. 1, 1949

2,462,971

UNITED STATES PATENT OFFICE 2,462,971

HYDRAULIC CIRCUIT WITH DUAL PRESSURE CONTROL

Matthew W. Huber, Watertown, N. Y., assignor to The New York Air Brake Company, a corporation of New Jersey Application May 8, 1947, Serial No. 746,795

10 Claims. (Cl. 60—97)

This invention relates to hydraulic circuits and particularly to control mechanism arranged to operate the circuit under high head pressure when there is a demand for hydraulic liquid and relatively low head pressure at all other times. The system was developed for use on airplanes and since this field of use imposes peculiarly difficult requirements, which are met by the invention, the concept will be described as so used.

It is usual practice on large bombing planes and cargo planes to operate secondary mechanism, such as landing gear, flaps, tail surfaces and the like, hydraulically. The hydraulic pressure is developed by a pump or pumps driven by one or more of the propelling engines. As a consequence, the pump must run continuously when the plane is in flight. Since the capacity of such a pump is limited and since weight considerations dictate the use of the smallest practicable motors, it is necesary to operate the pumps at high speed, for example, from 2500 to 3500 R. P. M. and to develop high head pressures, for example, 3000 P. S. I. It is very difficult to keep a hydraulic circuit tight under a continually maintained pressure of 3000 pounds, and particularly so under the conditions of severe vibration encountered in an airplane.

In a prior application, Serial No. 626,690 filed November 5, 1945, now Patent Number 2,433,222, there is described a parallel cylinder pump of the variable displacement type in which displacement is controlled in response to head pressure. This pump has very good control characteristics in that it will deliver its maximum capacity or approximately its maximum capacity until the desired limiting pressure is closely approached and then reduce its displacement very rapidly. Because of these desirable characteristics, this particular pump is chosen for illustration. The pump itself is not a feature of the present invention and is not claimed herein. It is expressly recognized that other variable displacement pumps could be substituted without changing the basic principle.

According to the present invention, a shiftable controller which varies the displacement of the pump is operated by a regulator in the form of an expansible chamber motor, subject to the discharge pressure developed by the pump and acting on the controller in a direction to reduce the delivery rate of the pump. The controller sets the pump for any delivery rate between full delivery and zero. Since the maximum discharge pressure of the pump is high, the effective area of the regulator motor is very small. This motor is loaded in a direction to increase pump delivery by yielding means which take the form of a coil compression spring. This spring is sustained by an adjustable seat which takes the form of a piston whose effective area is many times that of the regulator motor. This piston is shiftable between two limiting positions in one of which the piston spring seat is not under pressure and the delivery of the pump is controlled to maintain a relatively low delivery pressure and in another of which the piston spring seat is under pressure and the delivery of the pump is controlled to maintain the standard value, say 3000 p. s. i. The piston spring seat has a bleed port so that pressure acting upon it in a direction to set the controller for high delivery pressure tends to bleed away unless continuously replenished. The delivery line of the pump is connected to a control valve or control valves controlling one or more accessory hydraulic motors and the piston spring seat is in communication with said accessory motors in such a way that when any accessory motor is under pressure, the piston spring seat is also under pressure and will move to establish high pressure delivery. When all the motors are vented, the pump is set for low pressure delivery. Thus the shiftable spring seat functions in response to pressure to select the delivery pressure at which the pump operates. It will hereafter be referred to as a pressure responsive selector.

This scheme requires a pilot line between the piston spring seat and each motor. A simple arrangement of check valves is used to prevent flow from one motor to the other. Since the piston spring seat is of large area, as compared to the regulatory motor, it is possible to have a very wide spread between maximum and minimum delivery pressures. For example, a pressure as low as 100 pounds is sufficient to shift the piston spring seat full stroke, and thus effect the desired selection.

Sometimes an airplane having several motors will require the use of certain motors which operate under high pressure only occasionally but will also require the use of other motors which are operated under lower pressures and at very frequent intervals. The invention permits an arrangement in which the lower pressure is available continuously and the high pressure only when a high pressure motor is being operated. For example, the system can be caused to develop 1500 pounds continuously and 3000 pounds on demand.

Practical embodiments will be described with reference to the accompanying drawings.

Figure 1 is an axial section of a parallel cylinder pump showing the control mechanism together with a hydraulic circuit including the pressure controlling pilot line, said circuit being drawn in minature as compared with the pump, to permit the control mechanism of the pump to be drawn on an adequate scale. This view shows a pump which operates at a high pressure, say 3000 p. s. i. when there is a demand for pressure fluid, and at a very much lower pressure, say 100 p. s. i. when there is no demand. Parts are shown as they would appear when there is a demand for high pressure fluid and the pump is conditioned to operate at full capacity.

Figure 2:
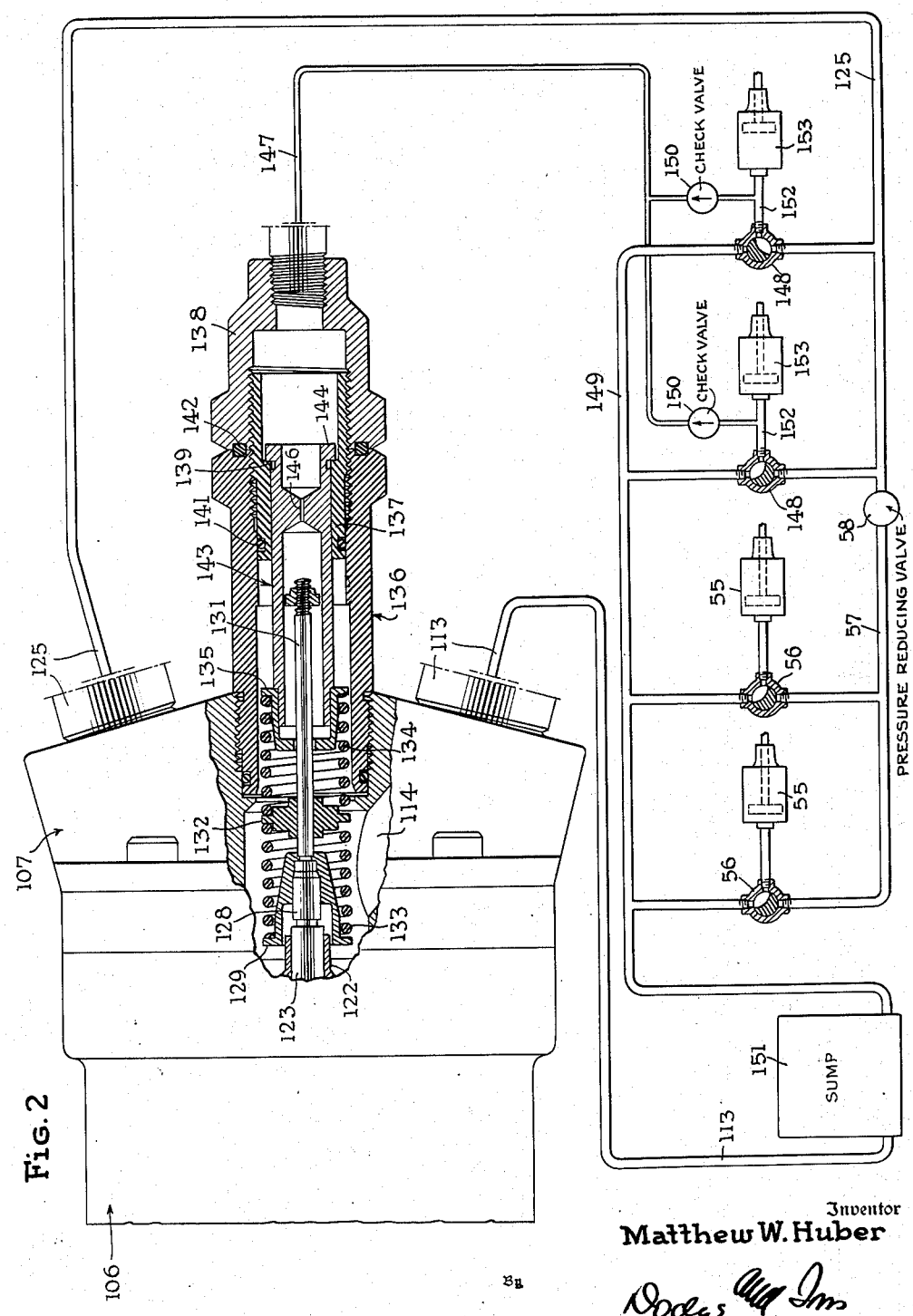

Figure 2 shows a view similar to Figure 1, but illustrating a modified construction designed to operate continuously at a moderate pressure, say 1500 p. s. i. and when there is a demand for high pressure fluid to operate at high pressure, say 3000 p. s. i. The controller of the pump is shown set to maintain high pressure. In this view, two of the motors included in the hydraulic circuit are of the type which never operates above 1500 p. s. i.

Refer first to Figure 1. The main housing of the pump is shown at 6 and the head at 7. The pump chosen for illustration has nine plungers which are parallel and which are reciprocated by a swash plate, not visible in the drawing. One plunger 8 appears in elevation and another plunger 8 is shown in section. These plungers work in cylinder bores in a cylinder block 9. Each plunger controls an inlet passage 11 and discharges oil through a spring-loaded discharge valve 12, of which there are nine, one for each cylinder and plunger.

The suction connection to the pump is indicated at 13 and communicates by passage 14 and port 15 with the intake ports 11 of all the cylinder bores.

Each plunger 8 is counterbored at its outer end, as indicated at 16, and the counterbore leads to radial ports 17. The ports 17 are controlled by regulatory valves 18 which encircle respective plungers and are shiftable in unison in the direction of the axes of the plungers by a spider 19. When the regulatory valves 18 are in the full displacement position shown in the drawing, the ports 17 are blanked by the regulatory valves 18 just as the end of the plunger 8 overtravels the edge of its inlet port 11. Consequently, the displacement of the pump is at its maximum. As the valves 18 are moved further and further to the right (with reference to Figure 1) the effective stroke of the pump plungers is reduced because the ports 17 remain open after the end of the plunger 8 has over-travelled the edge of the inlet port 11.

The spider 19 is mounted on a rod 21 which is slidable in a path parallel with the axis of the pump plungers 8. It is guided in the cylinder bushing 22 fixed in the center of the cylinder block 9, and has a piston head 23 which, in effect, is simply an enlargement of the rod 21.

The valves 12 discharge into a passage 24 which leads to the discharge connection 25 of the pump. The discharge pressure developed by the operation of the pump exists in the passage 24 and this passage is connected by a passage 26 with the cylinder space within the cylinder bushing 22 at the left end of the piston head 23. Thus, pressure developed in the passage 24 urges the rod 21 to the right. The effective area of the piston 23 is the difference between its cross sectional area and the cross sectional area of the rod 21 where the rod enters the cylinder bushing. Obviously this effective area is quite small. It must be small because the maximum pressure developed by the pump is high and it is not desirable to use a very heavy loading spring. A choke 27 is interposed in passage 26 to prevent the piston 23 from responding to such high frequency pressure pulsations as may exist in the passage 24.

To the right of piston 23 an extension of rod 21 forms a head 28 on which is mounted a thimble-shaped spring seat 29. Spring seat 29 is connected by a bolt 31 with a thimble-shaped spring seat 35. An intermediate spring seat 32 is slidable on bolt 31 and sustains the proximate ends of two springs 33 and 34, arranged in tandem between the spring seats 29 and 35. This arrangement facilitates assembly of the springs under initial stress and resists lateral deflection such as might occur with a single spring of the same overall length.

The mechanism so far described is basically similar to that described in the prior pump application above identified. The present invention adds, among other things, a pressure operated means for changing the regulating action of the springs 33 and 34.

Threaded into the end of the cap 7 is a motor housing 36, tubular in form and internally threaded at its outer end. Threaded into the outer end is an internally shouldered cylinder bushing 37. A cap 38 is threaded on to the projecting end of the cylinder bushing, the construction being such that the cylinder bushing can be adjusted axially in the housing 36 and then locked in place by the cap. The purpose of this is to permit adjustment of the position of shoulder 39 in the cylinder bushing. The position of this shoulder determines the maximum pressure setting of the pump controller and consequently requires adjustment. Leakage is precluded by conventional gaskets 41 and 42 which are mounted in grooves, as shown in the drawing.

Slidable in the cylinder bushing 37 is a piston 43 with a head 44 which limits the movement of the piston 43 inwardly (i. e. to the left in the drawing). This piston is urged inward, that is to the left, by a comparatively light coil compression spring 45. The spring seat 35 fits on the end of the piston 43 and is sustained thereby. A bleed port 46 permits a metered leakage through the piston 43 from the space at the outer (right-hand) end of the piston through the clearance around bolt 31, where it passes through spring seat 35, to the passage 14 and consequently to the inlet or low pressure side of the pump. The pilot line 47 is connected to cap 38 so that whatever pressure exists in the pilot line 47 reacts on the outer right-hand end of piston 43.

When piston 43 is forced to the left, head 44 engages shoulder 39, and springs 33, 34 acting in tandem are stressed to develop an appropriate spring loading. This loading opposes discharge pressure which urges piston 23 to the right. When the supply of pressure fluid to the pilot line 47 is cut off, hydraulic pressure at the right of piston 43 will bleed away at a controlled rate through port 46. Consequently, the piston 43 will move outward and the loading springs 33 and 34 will be no longer rigidly sustained by the piston 43.

As a practical matter, the loading function is transferred to the spring 45 which is comparatively weak. Whether the springs 33 and 34 operate as a rigid connection depends on the minimum stress imposed on these springs by bolt 31, but in any case they approximate that condition so that to all intents and purposes the loading of the pump is determined by the light spring 45. This is so chosen that the pump will operate at a low pressure, say 100 pounds. The precise pressure is not important, provided it is low, and always provided that it is high enough to force piston 43 to its limit of motion despite the resistance offered springs 33 and 34. The point just mentioned is significant. The lowest discharge pressure developed by the pump should be capable of shifting the pressure control to the high pressure setting.

Discharge line 25 leads to a series of control valves 48. These are illustrated conventionally as three-way valves, each of which has one connection to the high pressure line 25, a second connection to discharge line 49 which leads to the low pressure sump 51, and a controlled connection 52 which leads to a motor 53. These motors are here illustrated as simple single acting displacement motors, but so far as the invention is concerned, it is immaterial what type they are. They can be any consumer of pressure fluid.

Each valve 48 connects its related motor 53 selectively to supply line 25 or to discharge line 49.

According to the invention, the valve 48 should also connect pilot line 47 to the high pressure line 25 whenever it connects the related motor 53 to the high pressure line. This could be done in various ways but the simplest way is to connect the line 47 directly to the branch 52. It is necessary to prevent the pilot line 47 from connecting each motor 53 with another or others. The simplest arrangement to produce this result is to interpose, in each connection, a check valve 50 opening away from the branch 52. Because of the use of these check valves, the valve 48 cannot function to vent the line 47. It is this circumstance that leads to the use of the bleed port 46 but there are incidental advantages in its use.

Unless pressure fluid is continuously supplied to the line 47, the pressure acting inward on the piston 43 will bleed away through the port 46. Whenever any of the motors 53 is under pressure, pressure is maintained in the pilot line 47 despite the bleeding action of the port 46. However, if all the motors are exhausted, the pressure fluid which had forced piston 43 to the left, bleeds away at a rate which can be selected by choosing an appropriate capacity for the port 46. Thus the part 43 is a pressure-responsive selector and functions to select between two different delivery pressures.

The first and second of the row of valves 48 are shown set in exhaust position. The third is set in supply position. Consequently, in Figure 1, the line 47 is under pressure and the pump is set to maintain 3000 pounds. If the third valve 48 be turned from the position shown to release position, all other valves 48 remaining in release position, the pressure in line 47 will bleed away and the piston 43 will move to the right, transferring control from the springs 33, 34 to the light spring 45. Experience has shown that the discharge pressure of the pump falls gradually over a period of several seconds. If any of the valves 48 be then moved to supply position, the pressure in the line 25 will rise to 3000 pounds in a fraction of a second, but the response of the control is so sensitive that the 3000 pound pressure is reached without hydraulic shock.

The high pressure is attained before the motor 53 has moved full stroke and the demand for liquid which is then continuing and the assumption of load by the motor are sufficient to inhibit any serious shock effect. Since a suddenly applied load produces much more severe strains than does a slowly applied load of the same magnitude, the importance of this characteristic is obvious.

Modification, Fig. 2

In Fig. 2, parts essentially similar to parts described in Fig. 1 are given the same reference numeral, increased by 100, so that in discussion of the two embodiments, no confusion can occur, while detailed description can be minimized.

So far as the pump is concerned the essential differences are

1. There is no spring corresponding to spring 45 of Fig. 1.
2. Piston 143 can move between the position shown in which head 144 engages shoulder 139 (high pressure setting) and a position in which head 144 engages the cap 138 (low pressure setting).
3. Bolt 131 is made long enough to allow spring seat 135 to move through the described range.
4. Springs 133, 134 are so chosen as to strength and scale that, in high pressure setting of pressure-responsive selector 143, they control at the desired high pressure, here assumed to be 3000 p. s. i. and, in low pressure setting, they control at the desired low pressure, here assumed to be 1500 p. s. i.

In short, where the spread between high and low pressure is too great to be effected by adjusting the spring unit, control can be transferred to a lighter spring as is indicated in Fig. 1. Where the spread is not too great the construction of Fig. 2 is preferred because simpler.

As to the circuit, the only differences in Fig. 2 as compared to Fig. 1 arise from the optional presence of additional motors which operate at 1500 p. s. i.

There is a supply line 125, exhaust line 149, sump 151, two valves 148 and two motors 153. For each of these motors there is a check valve 150 controlling connection to pilot line 147. These parts all function in the manner described as to similarly numbered parts in Fig. 1.

The additional motors are indicated at 55. They are controlled by three-way valves 56 similar to valves 148 and similarly connected to exhaust line 149. These valves are fed with liquid at 1500 p. s. i. by line 57 which is fed from line 125 by a pressure reducing valve 58.

Valve 58 is of the type which controls in response to pressure on its discharge side. Thus, when line 125 is at 1500 p. s. i. valve 58 simply opens wide. When pressure in line 125 is above 1500 p. s. i. valve 58 functions to limit pressure in line 57 to 1500 p. s. i.

Motors 55 are not connected to pilot line 147, and can be operated at 1500 p. s. i. while the system is operating at that pressure, or while a motor 153 is operating at 3000 p. s. i.

The pump mechanism is not claimed herein but forms the subject matter of my Patent No. 2,433,222 and my application Serial No. 757,621, filed June 27, 1947.

I claim:

1. The combination of a displacement pump including a shiftable controller for varying between zero and full capacity the displacement of the pump; means responsive to the pressure of liquid delivered by the pump and arranged to shift said controller in response to rising delivery pressure in a direction to reduce pump displacement; adjustable loading means serving to resist such shift; at least one motor device operable by liquid delivered by said pump; a valve operable to connect said motor device selectively with pump discharge or with exhaust; and pressure responsive means subject to pressure in said motor device and serving to adjust said loading means to maintain a low but positive discharge pressure when the motor device is exhausted and maintain maximum discharge pressure when said motor device is under pressure.

2. The combination of a variable displacement pump; a controller shiftable to vary the delivery rate of said pump between zero and a maximum; a regulatory motor responsive to the delivery pressure developed by said pump, urging said controller toward its zero setting; spring means biasing said controller in the opposite direction; a loading motor shiftable to load said spring means to cause the pump to deliver at a high pressure, said loading motor having a restricted vent, and being shiftable by the spring means when vented, to set the pump to deliver at a low pressure; a valve controlling the supply of liquid pumped by the pump to a consumer of pressure liquid, and means controlled by said valve for admitting liquid pumped by the pump to said loading motor at a rate materially exceeding the capacity of said restricted vent only when said valve delivers liquid to said consumer.

3. The combination defined in claim 2 in which the loading motor is a piston, and the spring means comprises a heavy spring for regulating at high pressure and a light spring for regulating at low pressure, said springs being arranged in tandem with said piston between them.

4. The combination of a variable displacement pump; a controller shiftable to vary the delivery rate of said pump between zero and a maximum; a regulatory motor responsive to the delivery pressure developed by said pump, urging said controller toward its zero setting; spring means biasing said controller in the opposite direction; a loading motor shiftable to load said spring means to cause the pump to deliver against a high back pressure, said loading motor having a restricted vent, and being shiftable by the spring means, when vented, to load the controller lightly so as to cause the pump to suspend delivery when opposed by a low but positive back pressure; a valve controlling the supply of liquid pumped by the pump to a consumer of pressure liquid; and a flow connection of a flow capacity materially exceeding that of said restricted vent from said consumer to said loading motor.

5. The combination defined in claim 4 in which there are a plurality of consumers of pressure liquid and valves respectively controlling the consumers, and in which all the consumers are connected with the loading motor but are isolated from each other by check valves interposed in said connections.

6. The combination of a variable displacement pump; a controller shiftable to vary the delivery rate of said pump between zero and a maximum; a regulatory motor responsive to the delivery pressure developed by said pump and serving to urge said controller toward its zero delivery setting; spring means biasing said controller in the opposite direction; a loading motor, which when subjected to pressure, loads said spring means to cause the pump to deliver against a high pressure, and when vented reduces the loading on said spring to cause the pump to suspend delivery when opposed by a lower pressure; a supply line connected with the discharge of said pump; a low pressure exhaust line; at least one high pressure motor; at least one corresponding inlet and discharge valve operable to connect said high pressure motor selectively with said exhaust line or with said supply line; a connection for subjecting said loading motor to the pressure established in the high pressure motor by the operation of said valve; a second supply line; a pressure reducing valve for supplying liquid to the second supply line from the first supply line at a pressure aproximating said lower pressure; at least one low pressure motor and a valve operable to connect said low pressure motor selectively with the second supply line or with the exhaust line.

7. The combination of a displacement pump having pressure operated means for reducing the displacement of the pump to zero in response to attainment of an established limiting discharge pressure; a pressure responsive selector for establishing alternatively two different limiting discharge pressures; a motor operable by pressure liquid delivered by the pump; a valve for connecting said motor selectively with the pump discharge or with exhaust; and a connection between said selector and said motor, the parts being so arranged that the selector establishes the lower of said two limiting pressures when the motor is connected to exhaust.

8. The combination defined in claim 7 in which there is a restricted vent from the selector, there are at least two motors each controlled independently by a corresponding valve, and all motors are connected with the selector by a connection having a flow capacity which materially exceeds that of said restricted vent but are isolated from one another by check valves, whereby the selector will establish the lower limiting pressure when all motors are connected to exhaust.

9. The combination of a displacement pump including a shiftable controller for varying between reduced and full capacity the displacement of the pump; means responsive to the pressure of liquid delivered by the pump and arranged to urge said controller in the direction to reduce pump displacement; two spring means differing in strength and each arranged to oppose said pressure responsive means; a spring seat shiftable between two positions in which respectively it causes one or the other of said spring means to oppose said pressure responsive means and thus establish high and low discharge pressure settings; a pressure motor serving when subject to discharge pressure to shift the spring seat to establish the high pressure setting; and means including a valve operable alternatively to subject said motor to the discharge pressure developed by the pump and to free it therefrom.

10. The combination defined in claim 9 in which the pressure motor stresses the high setting spring as it moves to establish the high discharge pressure setting; and an adjustable stop is provided to limit such motion of the motor.

MATTHEW W. HUBER.

REFERENCES CITED

The following references are of record in the file of this patent:

UNITED STATES PATENTS

| Number | Name | Date |
|---|---|---|
| 1,231,293 | Peters | June 26, 1917 |
| 2,210,427 | Oberholtzer | Aug. 6, 1940 |
| 2,250,539 | Landenberger | July 29, 1941 |
| 2,298,358 | Ernst | Oct. 13, 1942 |
| 2,299,234 | Snader et al. | Oct. 20, 1942 |